Aug. 13, 1957  G. P. BOSOMWORTH ET AL  2,802,239
TIRE BEAD LEDGE CONSTRUCTION

Filed Sept. 13, 1954  3 Sheets-Sheet 1

INVENTORS
GEORGE P. BOSOMWORTH
FRANK S. KING
RICHARD C. SPRAGUE

BY W. A. Fraser

ATTY

Aug. 13, 1957  G. P. BOSOMWORTH ET AL  2,802,239
TIRE BEAD LEDGE CONSTRUCTION
Filed Sept. 13, 1954  3 Sheets-Sheet 2

INVENTORS
GEORGE P. BOSOMWORTH
FRANK S. KING
RICHARD C. SPRAGUE
By W. A. Fraser
ATTY.

Aug. 13, 1957   G. P. BOSOMWORTH ET AL   2,802,239
TIRE BEAD LEDGE CONSTRUCTION

Filed Sept. 13, 1954   3 Sheets-Sheet 3

INVENTORS
GEORGE P. BOSOMWORTH
FRANK S. KING
RICHARD C. SPRAGUE
BY W. A. Fraser
ATTY

United States Patent Office 2,802,239
Patented Aug. 13, 1957

2,802,239

TIRE BEAD LEDGE CONSTRUCTION

George P. Bosomworth, Richard C. Sprague, and Frank S. King, Akron, Ohio, assignors to The Firestone Tire & Rubber Company, Akron, Ohio, a corporation of Ohio Application September 13, 1954, Serial No. 466,465

5 Claims. (Cl. 18—17)

This application is a continuation-in-part of our previous application, Serial No. 285,674, filed May 2, 1952, now Patent No. 2,713,382 of July 19, 1955.

This invention relates to pneumatic, blowout-safe, tubeless tires, and more particularly to methods and apparatus for the manufacture of tubeless tires of the diaphragm-compartmented type.

The suggestion has been made to provide a tubeless tire with a removable diaphragm having the general shape of an open-beaded tire and having inextensible bead portions, said diaphragm bead portions being adapted to seat and be retained upon rubber ledges on the lateral inside surface of the tire beads in substantially air-tight but removable relation therewith. The diaphragm so seated divides the space inside the tire into radially inner and outer chambers, the diaphragm being adapted to function as an auxiliary tire load carrying means in the event of a tire blowout thereby preventing complete collapse of the tire and making the tire substantially blowout safe.

To mount said diaphragm in a tubeless tire in order to provide the above mentioned blowout safe feature it has been proposed to provide the aforementioned rubber ledge around the lateral inside surface of each tire bead. The molding of this ledge in exactly the same shape and dimensions in tire after tire has heretofore been a serious problem. Exact reproducibility of the molded shape of the rubber ledge in the manufacture of successive, blowout-safe tires is necessary in order that the beads of any diaphragm will seat snugly in any tire. If the diaphragm beads do not fit against the rubber ledge snugly, air will escape from the inner to the outer compartment of the tire after a blowout and the protection normally provided by the diaphragm will be lost. In some cases a distorted or poorly dimensioned tire bead ledge may even result in the diaphragm being displaced from its seats during normal operation of the tire before blowout, the tire thus losing its balance and blowout-safe characteristics.

In shape the rubber ledge comprises an endless annular seat molded on and integral with the lateral inside face of each tire bead. Each ledge is provided with a substantially continuous radially outwardly opening groove adapted to receive and seat therein an inextensible bead of said diaphragm.

The formation of such a rubber ledge in a conventional pneumatic passenger tire would be impractical since the rubber required to form the ledge would be drawn or forced away from the fabric in the bead area during the ledge molding operation. Exposure of fabric in this area of a tubeless tire would result in air pressure loss by air wicking along the cords of the exposed fabric and subsequent deflation. Also, the exposed cords are subject to chafing because of lack of insulating rubber, with resulting failure during road operation of the tire. All of the foregoing enumerated difficulties are overcome by the present invention.

Heretofore the rubber ledge has been formed by premolding and cementing or curing it in position, or by the insertion of an all-metal molding ring into the tire against the lateral inside surface of both heads before vulcanization, but after bagging of the tire. Heat and pressure molded the contour of the metal ring into an excess of soft rubber superimposed on the lateral inside surface of the tire beads. When the tire was cooled, debagged and the all-metal rings removed, the rubber ledge remained. However, a disadvantage of using the all-metal ring resided in the distortion of the tire required for insertion and removal of the ring. Such tire distortion may produce incipient ply separations which could result in subsequent tire failure on the highway.

Another disadvantage of the all-metal ring resided in that it formed a rind or flash during vulcanization on the band ply of the tire, exposing body fabric. This was caused by the failure of the outer circumferential edge of the metal ring to fit snugly into the small space formed at the junction of the heavy-walled airbag used during tire cure and the band ply of the tire at a position near the base of the rubber ledge. After inflation of the tire, air seeped into this exposed fabric and thence out of the tire to cause separation of plies and deflation of the tire. The rind was minimized but not eliminated by providing a sharp edge on the metal ring at its outer circumference, but this sharp edge cut and mutilated the bead portion as the ring was inserted in and removed from the tire.

Further defective construction manifest in use of the all-metal ledge-molding ring was the displacement of the rubbery inner liner of a tubeless tire away from the tire cords in an area adjacent the curing bag to leave substantially no liner in the areas adjacent the curing bag and the metal ledge molding ring.

The use of a curing bag contoured on the lateral outside faces of the base thereof for molding the rubber ledge has been attempted. This method failed because the rubber of the curing bag assumes a permanent set under the heat and pressure of tire vulcanization distorting the grooves during repeated use, the effect becoming more pronounced with each successive cure. For this reason the rubber seating ledges were not identically shaped or dimensioned in successive tires.

The above-mentioned disadvantages of the prior art methods for forming the rubber ledge have been overcome in the present invention by the use of a thin flexible outer ring mounted on a solid metal inner ring used in a type of mold known as a curing bag inserting mold.

An object of the invention is to provide an improved method for forming a ledge on the lateral inside surface of the bead of a blow-out safe tubeless tire.

Another object of this invention is to provide an improved apparatus and method for forming rubber ledges on the lateral inside surfaces of the beads of a blow-out safe tubeless tire during tire vulcanization in a bag-inserting type mold.

Yet another object of this invention is to provide an apparatus and method for forming a rubber ledge on the lateral inside surfaces of the beads of a blow-out safe tubeless tire during vulcanization in a mold of the modern bag-inserting type.

Other and further objects will become apparent as the invention is set forth in detail and by reference to the accompanying drawings of which:

To provide a tire (Fig. 1) of the invention, a tire casing is built up by steps not shown on a tire building drum from a number of plies of rubberized fabric upon which is superimposed a rubbery tread portion. The unvulcanized tire casing is provided on the inner side with an inner liner member 3 which serves the purpose of covering the cords of the tire and protecting them from the internal air pressure which supports the load in the finished tire. A ledge forming strip 4 is adhered in the unvulcanized state adjacent the tire bead to give body to the part of the tire in which the ledge 18 is molded.

The inner liner may be formed of any rubbery material which is resistant to the passage of air. Such a rubbery material may be comprised in part of butyl type rubber which, as described in United States Letters Patent Nos. 2,356,128, 2,356,129 and 2,356,130 to Thomas and Sparks, is essentially a copolymer of a major portion of an isolefin and a minor portion of an open-chain conjugated diolefin. Other rubbery materials suitable for the innerliner are well known to those skilled in the art of tire compounding.

Figure 2:
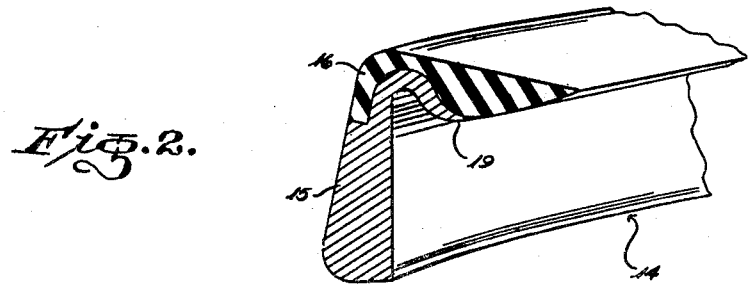
Figure 2 is a fragmentary sectional view in perspective of the novel ledge-molding ring of the invention.

Referring to Figure 2 the novel, composite molding ring generally indicated at 14 comprises a radial hook-shaped inner portion in the form of rigid ring 15, and an annular component 16 of rubbery material permanently attached to said rigid portion by vulcanization or by other satisfactory means.

The flexible and rigid portions of rings 14 are so disposed during tire vulcanization as to expose the hook-shaped surface of rigid ring 15 to the filler strip 4 on the lateral inside surface of the tire beads. In the forming of the ledges 18 the ledges and adjacent grooves are molded by the rigid hook-shaped portion 15 of the ring. The flexible radial outer ring portion 16 molds the side of the ledge groove and the adjacent area of the inner liner 3 of the tire. The flexible nature of outer ring portion 16 prevents the rigid edge 19 (Figure 2) of the hook of the inner ring portion 15 from digging into portions of inner ply 3 and thereby exposing tire fabric.

The flexible outer ring may be of rubber, plastic, or any other flexible rubbery material which will easily adapt itself under pressure to fill the space between the tire and curing bag.

Although the blowout safe tubeless tire may be cured in the pot heater, watch case, or jacket type mold or any other tire vulcanizing mold it is desirable to use the present invention in molds of the built-in-bag type such as the "Bag-o-matic Press" manufactured by the McNeil Machine and Engineering Company, Akron, Ohio. Because of the production efficiency of this type of mold, many blow-out safe tubeless tires are vulcanized therein.

Figures 3, 4:
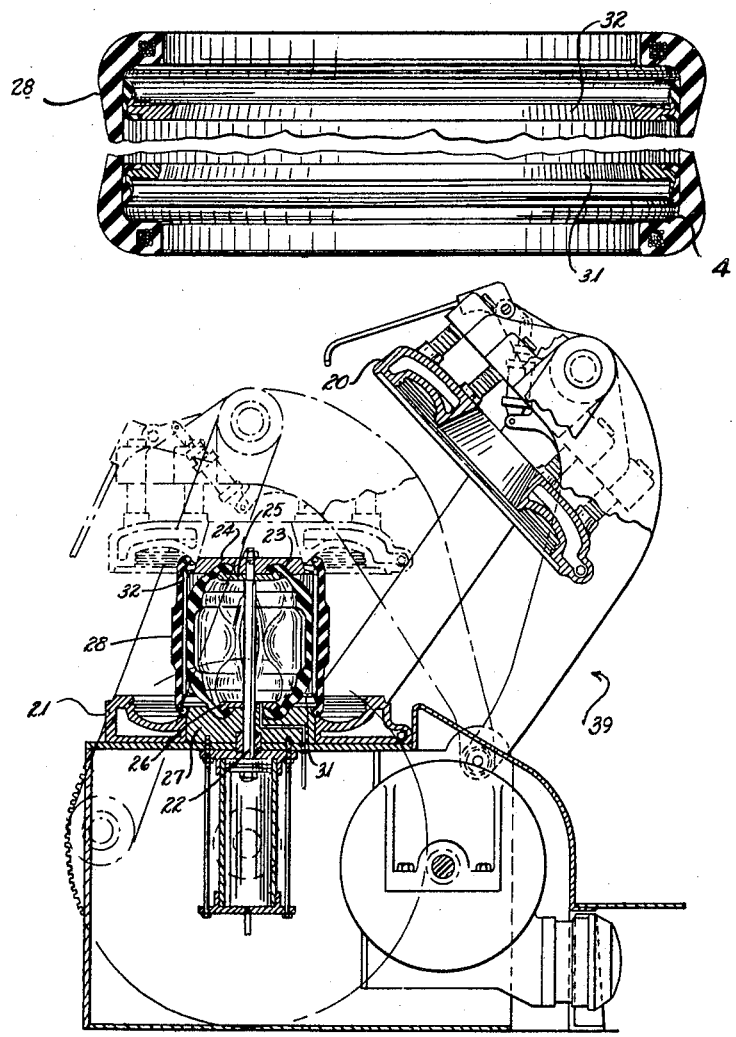
Figure 3 is a longitudinal sectional view of an unvulcanized tire mounting internally two ledge molding rings showing the invention as used during tire vulcanization in a bag-inserting type mold.
Figure 4 is an axial sectional view of an open tire curing press of the bag-inserting type containing an unvulcanized tire and the two ledge molding rings.

A mold of this type generally indicated at 39 is illustrated in Figure 4 wherein an upper movable mold section 20 and a lower fixed section 21 co-act to form the tire receiving cavity of a two section tire vulcanizing mold as described in United States Patent 2,296,800 to Soderquist. Piston rod 22 is axially mounted relative to lower mold section 21 and adapted for longitudinal movement as the mold is opened and closed by means not shown and not part of this invention. Cylindrical rubber curing bag 23 adapted for containing hot water, steam, or other gas is radially disposed in surrounding relation to piston rod 22 and hermetically sealed to the upper end thereof by the clamping action of head 24 against upper clamping disc 25. Likewise, the bottom of cylindrical curing diaphragm 23 is hermetically sealed by lower clamping disc 26 and block 27.

To commence the curing operation using said curing diaphragm an uncured tire band 28 is positioned radially about shaping diaphragm 23 so that one bead rests on lower mold section 21. Upon operation of the operating mechanism (not shown), upper mold section 20 is brought into position abutting lower mold section 21. While such positioning is taking place piston rod 22 is retracted axially through lower mold section 21 with accompanying distension of curing bag 23 and shaping of the uncured tire 28.

The safety diaphragm seating ledge 18 is formed in the blow-out safe tubeless tire in this modification by the use of two novel rings 31 and 32 shown in Figure 3 mounted in an uncured, unformed tire 28. The diameter of head 24 and clamping member 25 of the mold (Fig. 4) requires that the diameter of lower ledge forming ring 31 be large enough to slip thereover. This ledge forming ring after passing over the head 24 seats on block 27. Upper ledge molding ring 32 has a diameter less than ring 31 but a diameter great enough to slide over the upper end of and partly down over and in seating relation to head 24. The inner annular surface of upper ledge molding ring 32 is tapered complementary to the taper of head 24 while the inner annular surface of lower ledge forming ring 31 is tapered complementarily to the taper of block 27.

Figure 5:
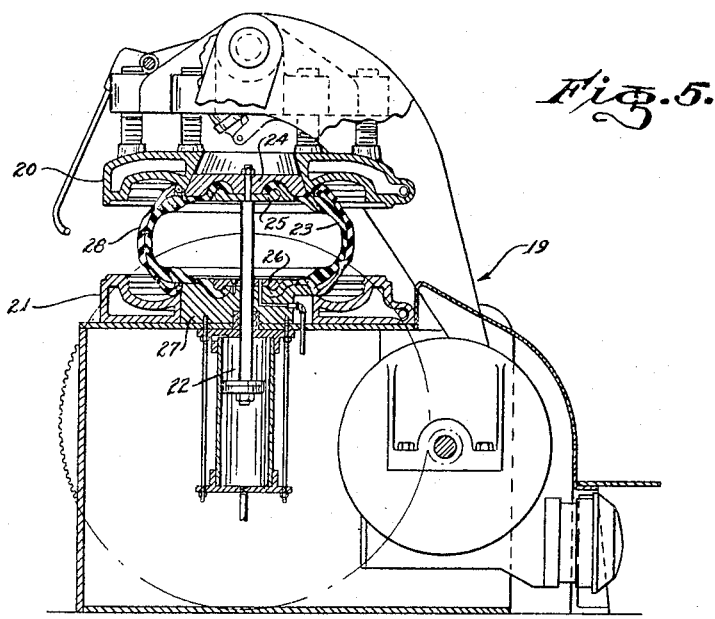
Figure 5 is a similar view with the mold partially closed.
Figure 6:
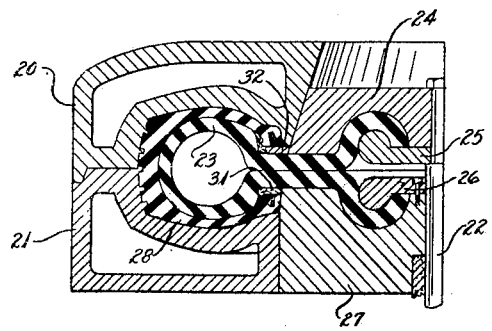
Figure 6 is an enlarged fragmentary section of a blow-out safe tubeless tire positioned in the curing diaphragm type mold during vulcanization.

The two rings may be positioned on block 27 and head 24 as heretofore described and an uncured, unshaped tire band slipped over both rings and the curing bag of the mold in preparation for vulcanization. However, in the preferred modification of the invention the two rings are inserted in the uncured, unshaped tire band 30 as shown in Figure 3. The ring of greatest inside diameter, ring 31, is placed in what necessarily becomes and will be described as the base of the tire band. Ring 32, of less diameter, is positioned inside the bead at what has necessarily become the top of the tire band. The tire band thus assembled with the rings is lowered down into position around the curing bag of the mold. The upper and lower ledge molding rings 31 and 32 respectively register with the head 24 and block 27 respectively. The mold is closed as heretofore shown in Figures 5 and 6 and steam circulated in cavities provided in upper and lower mold sections 20 and 21. Internal gas or water pressure is supplied to bag 23 to press the novel ledge molding rings into the soft hot rubber of the tire bead, forming the desired rubber ledge. After a length of time sufficient to vulcanize all portions of the tire to a desired optimum cure the mold is opened, the tire removed. The rings are removed from the cured tire and two uniform annular seating ledges remain on the lateral inside surfaces of the beads.

Figure 1:
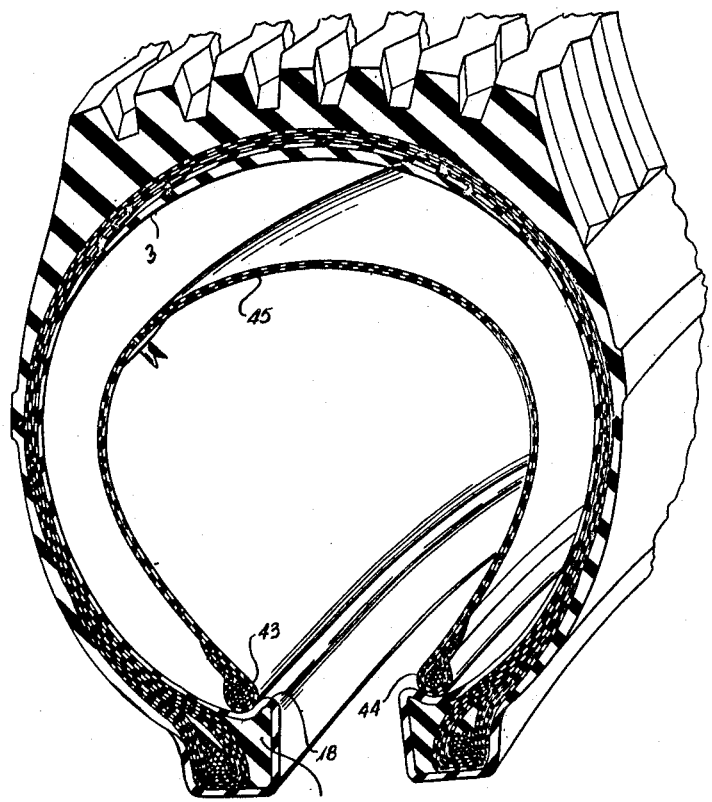
Figure 1 is a transverse sectional view in perspective of a vulcanized blowout safe tubeless tire mounting a safety diaphragm on the molded seating ledges of the invention.

The annular ledges in finished tire are now adaptable to the mounting the inextensible beads 43 and 44 of removable air retaining diaphragm 45 as shown in Figure 1 whereby blow-out protection is provided during road operation of the tire.

Modifiaction may be resorted to without departing from the spirit of the invention or the scope of the appended claims.

We claim:

1. In a tire vulcanizing mold of the curing bag inserting type having two mold sections defining a tire receiving cavity, the combination of a pair of molding rings with a normally cylindrical rubbery curing bag having open ends, the opening at one end of said bag in gas-containing attachment to one of said mold sections and the opening at the other end of said bag in gas-containing attachment to a piston rod adapted for axial movement in relation to said bag and said one of said mold sections, means for moving said piston rod axially in timed relation with movement of said mold sections, each said ring adapted to contact the lateral axially inner surface of the bead of a tire being vulcanized in the mold, said ring comprising an annular solid, radial inner portion with a flexible annular, radial outer portion terminating axially in a thinly tapered edge, said molding rings annularly disposed about said bag, one ring at each end thereof, with said edges extending axially outward from said bag.

2. In a tire vulcanizing mold of the curing bag inserting type having two mold sections defining a tire receiving cavity, in combination a normally cylindrical rubbery curing bag having open ends and a first ring and a second ring, said first ring and said second ring each having inner circumferential surfaces, the opening at one end of said bag held in gas-containing attachment between a clamping member and a circular tapered block mounted on one of said mold sections and the opening at the other end of said bag held in gas-containing attachment between a second clamping member and a tapered circular clamping head mounted on the end of a piston rod, said rod adapted for axial movement in relation to said bag and said one of said sections, means for moving said piston axially in timed relation with movement of said mold sections, the inner circumferential surface of said first ring tapered for complementary mating fit with said tapered block, the inner circumferential surface of said second ring tapered for complementary mating fit with said clamping head, said first ring and said second ring each having a solid, annular, radial inner portion with a flexible annular, radial outer portion terminating in a thinly tapered edge extending axially outward from said bag.

3. A method of forming a contour on the lateral inside surface of a tire bead as the tire is vulcanized in a bag inserting type mold comprising the steps of mounting a first ring adjacent one end of the bag of said mold and disposed in annular relation to the base of said bag, mounting a second ring on the other end of said bag disposed in annular relation to the base of said bag, slipping an uncured tire band over said bag to position said rings against the lateral axially inner surface of the tire, closing the mold and simultaneously expanding the bag to press said rings into said tire while applying heat and pressure to said bag and heat to said mold.

4. In a tire vulcanizing mold of the curing bag inserting type having two mold sections defining a tire receiving cavity, the combination of a pair of molding rings with a normally cylindrical rubbery curing bag having open ends, the opening at one end of said bag in gas containing attachments to one of said mold sections and the opening at the other end of said bag in gas containing attachment to a piston rod adapted for axial movement in relation to said bag and said one of said mold sections, means for moving said piston axially in timed relation with movement of said mold section, each said ring comprising an annular solid radial inner portion having a hook-shaped axially outer edge and a flexible annular radial outer portion adhered to said inner portion including the back of said edge and terminating axially in a thinly tapered edge, said molding rings annularly disposed about said bag and adapted to contact the lateral axially inner surface of the bead of a tire being vulcanized in the mold, one ring at each end thereof with said edges extending axially outwardly from said bag.

5. In a tire vulcanizing mold of the curing diaphragm inserting type having two mold sections defining a tire receiving cavity, in combination a normally cylindrical rubbery curing diaphragm having open ends and a first ring and a second ring, said first ring and said second ring each having inner circumferential surfaces, the opening at one end of said diaphragm held in gas-containing attachment between a clamping member and a circular tapered block mounted on one of said mold sections and the opening at the other end of said diaphragm held in gas-containing attachment between a second clamping member and a tapered circular clamping head mounted on the end of a piston rod, said rod adapted for axial movement in relation to said diaphragm and said one of said sections, means for moving said piston axially in timed relation with movement of said mold sections, the inner circumferential surface of said first ring tapered for complementary mating fit with said tapered block, the inner circumferential surface of said second ring tapered for complementary mating fit with said clamping head, said first ring and said second ring each having a solid, annular, radial inner portion with a flexible annular, radial outer portion terminating in a thinly tapered edge.

References Cited in the file of this patent
UNITED STATES PATENTS

| | | |
|---|---|---|
| 1,289,768 | Hopkinson | Dec. 31, 1918 |
| 2,495,664 | Soderquist | Jan. 24, 1950 |
| 2,597,550 | Tritt | May 20, 1952 |
| 2,645,265 | O'Neil | July 14, 1953 |